(No Model.)
2 Sheets—Sheet 1.
J. HILL.
Mechanical Movement.
No. 226,751.  Patented April 20, 1880.
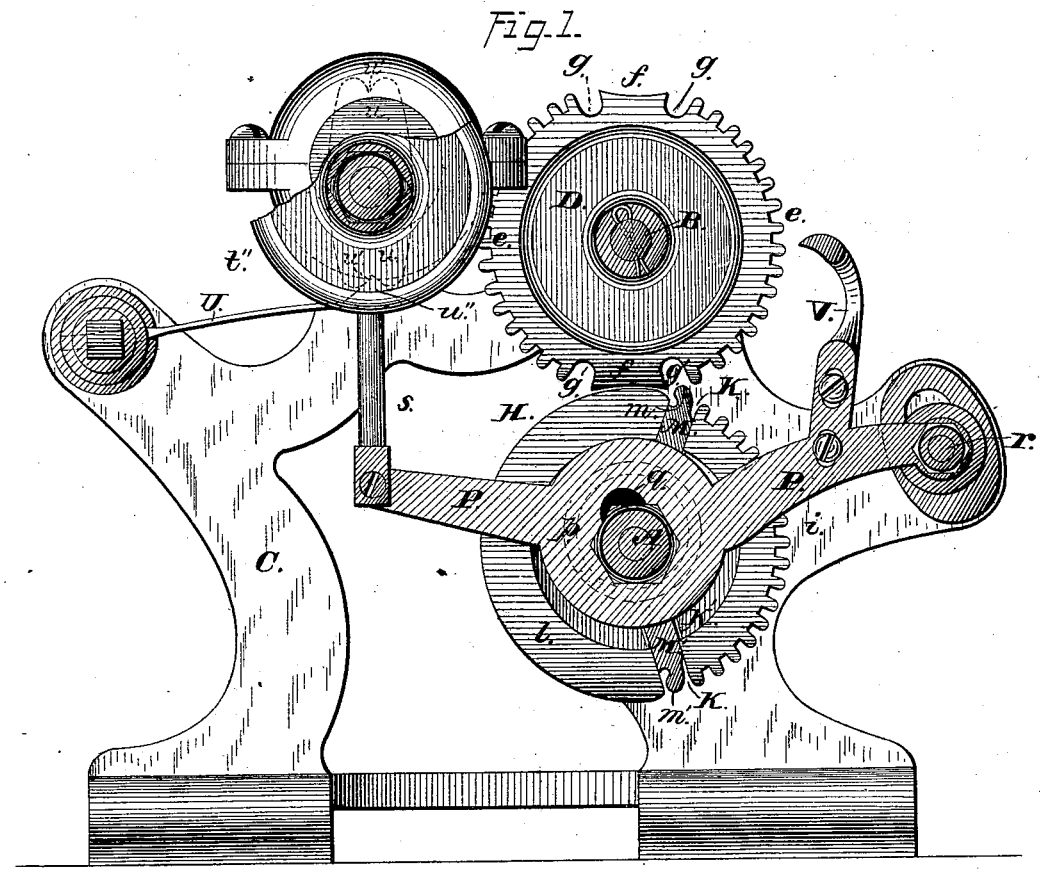
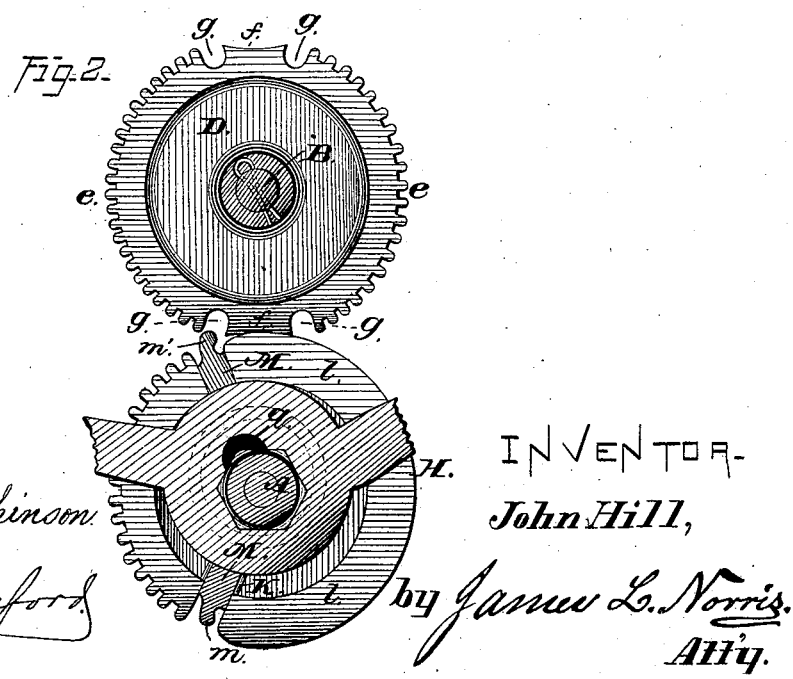
WITNESSES:
Jas. E. Hutchinson
J. A. Rutherford
INVENTOR
John Hill,
by James L. Norris,
Att'y.
N. PETERS, PHOTO-LITHOGRAPHER, WASHINGTON, D. C.

(No Model.) 2 Sheets—Sheet 2.

J. HILL.
Mechanical Movement.

No. 226,751. Patented April 20, 1880.

WITNESSES:
Jas. E. Hutchinson
J. A. Rutherford

INVENTOR:
John Hill,
by James L. Norris.
Att'y.

UNITED STATES PATENT OFFICE.

JOHN HILL, OF COLUMBUS, GEORGIA.

MECHANICAL MOVEMENT.

SPECIFICATION forming part of Letters Patent No. 226,751, dated April 20, 1880.

Application filed March 24, 1880. (No model.)

*To all whom it may concern:*

Be it known that I, JOHN HILL, a citizen of the United States, residing at Columbus, in the county of Muscogee and State of Georgia, have invented new and useful Improvements in Mechanical Movements, of which the following is a specification.

This invention relates to an improved combination of devices for transmitting an intermittent rotary motion from a continuously or intermittently rotating driving-wheel to a secondary wheel. Its object is to secure exactness of time in the motion and intermissions thereof of the secondary wheel with respect to the driving-wheel, and to provide for the entire cessation at will of the motion of the secondary wheel while the driving-wheel continues to rotate.

It consists, mainly, in a mechanical movement for producing intermittent rotary motion, in which a driving-wheel is provided with one or more radially-movable teeth, which may be adjusted at will for engagement with or disengagement from a tooth or teeth of a secondary wheel, whereby said driving-wheel may be caused to transmit intermittent rotary motion to said secondary wheel, or permitted to rotate independently thereof.

It also consists in certain novel constructions and combinations of devices for carrying out the principle of the invention, as will be hereinafter particularly described.

Figure 3:
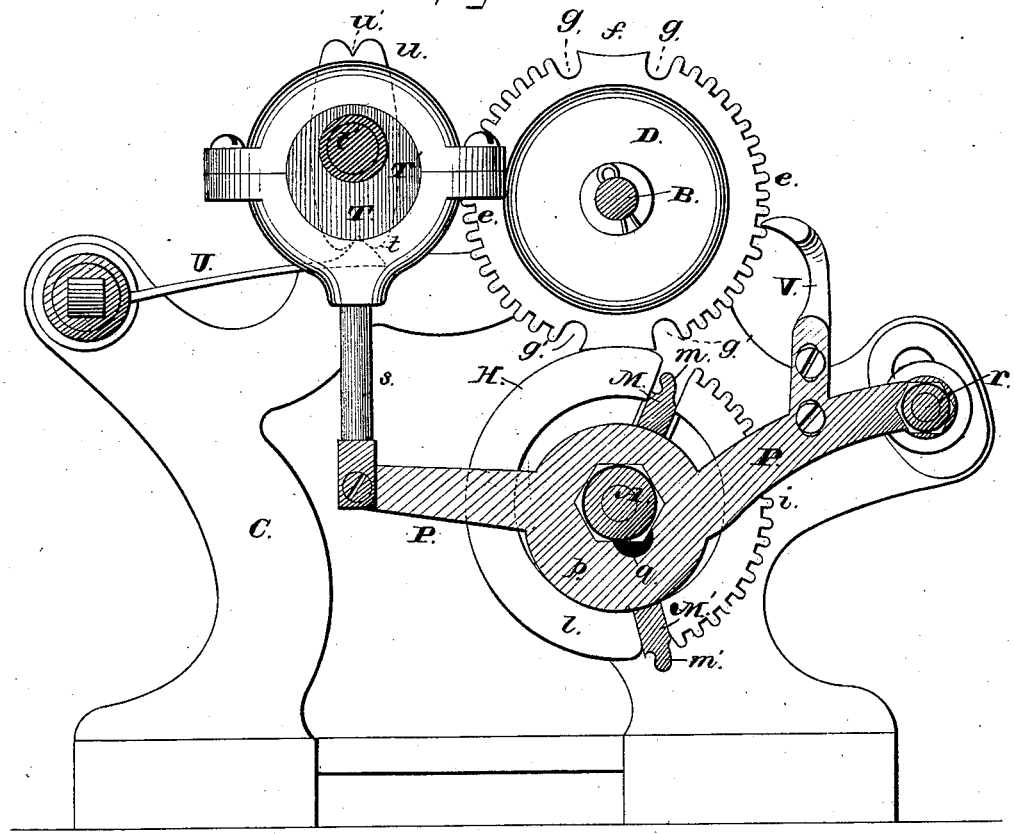
Figure 4:
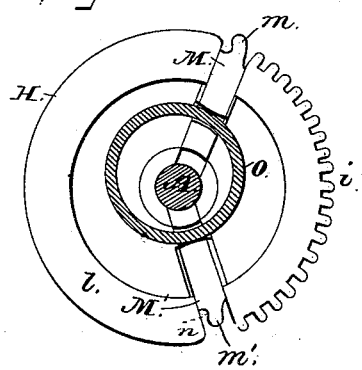
Figure 5:
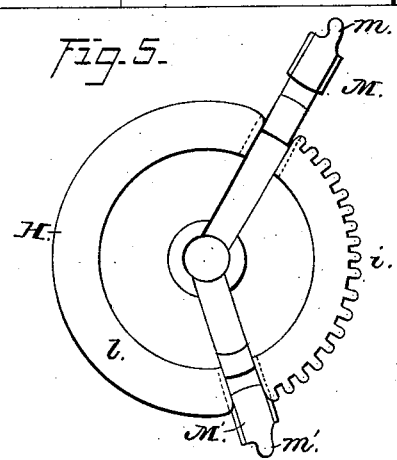

In the accompanying drawings, Figure 1 is a view in elevation of a mechanical movement constructed according to my invention. Fig. 2 shows the transmitting devices in different relative positions from those shown in in Fig. 1. Fig. 3 shows the transmitting devices arranged for entire cessation of the motion of the secondary wheel. Figs. 4 and 5 are detail views, illustrating the devices for placing the driving-wheel at will in condition to act or not to act upon the wheel carried by the secondary shaft.

The letter A indicates a rotary shaft, and B a stationary shaft, or it may be a movable shaft arranged to receive intermittent rotary motion from shaft A through intermediate devices. Both these shafts are mounted in the frame C, or may be mounted in the same relative positions and suitably supported in any other manner.

Upon the shaft B is mounted a wheel, D, provided with two sections, $e\ e$, of gear-teeth, between the ends of which sections are broad concave-faced teeth $f$, similar in form, and also in function, as will hereinafter appear, to the concave divisions of the well-known "Geneva stop." The tips or corners of these broad teeth do not extend so far outward as the tips of teeth $e$, and on each side of said broad teeth, between them and the other teeth, are cavities $g$, considerably deeper than the spaces between teeth $e$.

The wheel D is shown as mounted loosely upon a stationary shaft, but may be fixed upon a movable shaft.

Upon the shaft A is fixed a driving-wheel, H, of the same diameter as wheel D, and provided with a single toothed section, $i$, having the same number of teeth as the sections $e$, respectively, of wheel D, and adapted to mesh therewith. At each end of the section of teeth $i$ is formed a recess or cavity, K, from which leads a radial groove, K', in the face of the wheel and through a rim, $l$, which surrounds a circular recess in the face of the wheel. In these grooves K' are arranged sliding bars M, having formed at their outer ends teeth $m$, at their edges splines or feathers $m'$, which fit into corresponding grooves in the walls of the cavities K, and across their front faces, at a proper distance from their tips, grooves $n$. Into these grooves $n$ sets a circular flange, O, which projects from a widened portion, $p$, of an arm, P, in which is cut a slot, $q$, embracing the projecting end of shaft A. One end of the arm P is pivoted to an adjustable stud, $r$, and the other end to a rod, $s$, which is connected to a strap, $t$, surrounding an eccentric, T, carried by a sleeve, T', mounted upon a stud, $t'$, and provided with a hand-wheel, $t''$, part of which is shown broken away in Fig. 1 to permit the observation of parts in rear of it. The sleeve T' also carries two arms, $u$, (shown in dotted lines in rear of the eccentric in Fig. 1,) projecting, respectively, in the direction of the greatest and least throws of the eccentric, and having their ends curved and notched, as shown at $u'$. Into the notches $u'$ a triangular toe, $u''$, carried by a spring, U, is adapted to take and hold the sleeve from turning. The portion of the periphery of wheel H which is not toothed is formed on the same circle with the tips of the teeth $i$, and when the two wheels are in position, as shown in Fig. 1, with a concave tooth of wheel D next to the wheel H, should the teeth not be projected, as shown, the wheel H would rotate independently and not engage with wheel D; but when the tooth $m$ is projected it will enter cavity $g$, strike the edge of broad tooth $f$, and carry wheel D forward such a distance that the following section of teeth $e$ will become engaged with the section of teeth $i$ of wheel H, and be carried forward by the same until the next broad tooth $f$ is brought into such position that the tooth $m'$, which will then be projected, as hereinafter explained, will enter the cavity in front of it. The end of the smooth portion of the periphery of wheel H is so formed as to now impinge against the concave tip of tooth $f$ and give the wheel a further movement to bring the concavity of said tooth in coincidence with the smooth periphery of the wheel, as shown in Fig. 2. The wheel H is then out of engagement with wheel D, which has performed a half-revolution, and the latter will have no further motion until the former, in its rotation, again reaches the position shown in Fig. 1, when the same engagement will occur, and the wheel D be caused to complete the other half of its revolution.

The arm P, it will be understood, is held stationary, by the locking devices described, in the upper and lower positions of the throw of eccentric T, and when this arm is in either its upper or lower position the flange O is eccentric to shaft A. When in its upper position, as shown in Fig. 1, the said circular flange has its greatest projection above the shaft, and consequently, when the bars M and M' are carried upward by the wheel H, the flange O, setting in the grooves of said bars, acts as a cam to force said bars outward, so that their teeth will enter the cavities on each side of the broad teeth $f$, as before described.

There is necessity for but one bar, M', and its tooth, unless the wheel H is intended to have reverse movement and communicate a correspondingly intermittent motion to wheel D.

The object of the arm P and its connections and the sliding teeth is to place the wheel H at will either in or out of condition to communicate motion to wheel D.

In Fig. 3 the parts are shown in such position that the bars M M' and teeth $m$ $m'$ are projected when in their lower positions and retracted when in their upper positions, so that they will not engage with the teeth $f$ of wheel D, and consequently wheel H may rotate in either direction without moving wheel D.

In order that the wheel D may not be moved accidentally or by the jarring of machinery when not desired, the arm P is provided with a rigid pawl, V, which, when the arm is in its lower position, will engage with the teeth of said wheel.

The driven wheel D is not necessarily of the same diameter as wheel H, but is of such diameter and is provided with such a number of toothed sections as to produce the desired number of intermissions of motion in a single revolution. The driving-wheel H may also be provided with more than one toothed section and a corresponding number of sliding teeth, for use either in one or both directions.

The sliding teeth should only be projected or retracted when the fixed teeth are not in gear, and when said sliding teeth are away from the driven wheel. Otherwise the pawl will lock the driving-wheel H so that it cannot continue its rotation.

I do not confine myself to the particular manner shown and described for supporting and moving the ring or flange O for shifting the movable teeth. I prefer to obtain the movement of said flange or ring by connection with a pattern-chain, such as is used with drop-box or fancy harness-motion of looms, and my improved mechanical movement is especially designed for actuating such drop-box and fancy harness-motions. In such application of the invention the pattern-chains afford the index for the movements of the devices for operating the sliding teeth, and the driven wheel produces movements which control the motion of the drop-boxes.

I prefer to operate the sliding teeth by means of the ring or flange O; but other forms of devices may be used—as, for instance, springs may hold the teeth in a retracted position, and a suitable cam-wheel, in contact with the inner ends of the bars M and M', or with studs projecting therefrom, may project said bars and the teeth; or the said bars may be moved by suitable gear-connections, giving the action at times required.

What I claim is—

1. A mechanical movement for producing intermittent rotary motion, in which a driving-wheel is provided with one or more radially-movable teeth, which may be adjusted at will for engagement with or disengagement from a tooth or teeth of a secondary wheel, whereby said driving-wheel may be caused to transmit intermittent rotary motion to said secondary wheel, or permitted to rotate independently, substantially as described.

2. The combination, with the driving-wheel H and a secondary suitable wheel adapted and arranged for intermittent connection therewith, of the sliding bars provided with teeth and arranged to move radially upon said driving-wheel, and suitable devices for forcing said teeth outwardly at intervals to engage with or move the secondary wheel, substantially as described.

3. The combination, with the driving-wheel H, provided with radial grooves, of the sliding toothed bars moving in said grooves and grooved transversely, and the adjustable ring or flange O, setting in the grooves of said toothed bars and guiding the same, substantially as described.

4. The combination, with the wheel D, of wheel H, provided with radially-movable teeth, arm P, provided with flange or ring O, adapted to operate said teeth, and the pawl V, arranged to engage wheel D when arm P is in its lower position, substantially as and for the purpose set forth.

In testimony whereof I have hereunto set my hand in the presence of two subscribing witnesses.

JOHN HILL.

Witnesses:
  HENRY BRUCE,
  L. F. WOODRUFF.